United States Patent [19]

Duan et al.

[11] Patent Number: 5,610,232

[45] Date of Patent: Mar. 11, 1997

[54] AQUEOUS NON-GELLING, ANIONIC POLYURETHANE DISPERSIONS AND PROCESS FOR THEIR MANUFACTURE

[75] Inventors: Youlu Duan, Minneapolis; Sonja Stammler, St. Criox; Scott Rhein, Forest Lake; Lowell Lindquist, St. Paul, all of Minn.

[73] Assignee: H.B. Fuller Licensing & Financing, Inc., Arden Hills, Minn.

[21] Appl. No.: 480,780

[22] Filed: Jun. 7, 1995

Related U.S. Application Data

[63] Continuation-in-part of Ser. No. 304,653, Sep. 9, 1994, and Ser. No. 343,676, Nov. 22, 1994, which is a continuation-in-part of Ser. No. 126,508, Sep. 24, 1993, abandoned.

[51] Int. Cl.$^6$ .......................... C08L 75/06; C09J 175/06; B32B 27/40
[52] U.S. Cl. ................ 524/840; 156/331.1; 156/331.4; 156/331.7; 428/423.1; 428/423.4; 428/423.7; 428/424.2; 428/424.6; 428/424.8; 428/425.1; 428/425.8; 524/500; 524/507; 524/591; 525/123; 525/127; 525/440; 525/454; 525/455; 525/457; 525/528; 528/71; 528/905
[58] Field of Search ..................... 524/500, 507, 524/591, 840; 525/123, 127, 440, 454, 455, 457, 528; 528/71, 905; 156/331.1, 331.4, 331.7; 428/423.1, 423.4, 423.7, 424.2, 424.6, 424.8, 425.1, 425.8

[56] References Cited

U.S. PATENT DOCUMENTS

| 3,169,949 | 2/1965 | Büning | 526/189 |
|---|---|---|---|
| 3,479,310 | 11/1969 | Dieterich et al. | 524/591 |
| 3,705,164 | 12/1972 | Honig et al. | 524/591 |
| 3,832,333 | 8/1974 | Chang et al. | 528/354 |
| 3,867,171 | 2/1975 | Ellsworth | 428/195 |
| 3,870,684 | 3/1975 | Witt et al. | 524/591 |
| 3,919,351 | 11/1975 | Chang et al. | 428/425 |

(List continued on next page.)

FOREIGN PATENT DOCUMENTS

| 673432 | 4/1966 | Belgium . |
|---|---|---|
| 764009 | 7/1967 | Canada . |
| 928323 | 6/1973 | Canada . |
| 0237997A1 | 3/1987 | European Pat. Off. . |
| 0222289A3 | 5/1987 | European Pat. Off. . |
| 0296098A2 | 6/1988 | European Pat. Off. . |
| 0315832A1 | 10/1988 | European Pat. Off. . |
| 0369389A1 | 11/1989 | European Pat. Off. . |
| 0344912A3 | 12/1989 | European Pat. Off. . |
| 1443909 | 1/1965 | France . |
| 1200318 | 9/1965 | Germany . |
| 2437218 | 2/1976 | Germany . |
| 2446440 | 4/1976 | Germany . |
| 3903804 | 8/1990 | Germany . |
| 4109447A1 | 1/1992 | Germany . |
| 4024567A1 | 2/1992 | Germany . |
| 482761 | 1/1970 | Switzerland . |
| 1128568 | 9/1968 | United Kingdom . |
| 91/15529 | 10/1991 | WIPO . |
| 92/02568 | 2/1992 | WIPO . |
| 92/16576 | 10/1992 | WIPO . |

OTHER PUBLICATIONS

Product Brochure, "Dispercoll KA–8464" Bayer/Mobay (Jan. 1989).
Holmbach, "Polyurethane dispersions and emulsifiable polyisocyanates for water–based aAdhesives", Bayer AG., (Jul. 1990).
Ganster et al., "Dispercoll Trait Products KA 8464 and KA 8481 as raw materials for water–based dispersion adhesives", Bayer AG. (Aug. 1989).
Product Brochure: Aqueous Polyurethane Dispersions From TMXDI® (META) Aliphatic Isocyanate, Feb. 1989.
NIAX® Performance Polyether Polyol PWB–1200 (From Union Carbide Corporation), 1989.
Arendt, et al., "m–and p–TMXDI: Two New Isocyanates For The Polyurethane Industry," *Journal of Cellular Plastics*, Dec. 1982, pp. 376–383.
Ryan, et al., "The Development of New Aqueous Polyurethane Dispersions for Coatings," Presented at the Water–Bourne, Higher Solids, and Powder Coatings Symposium Feb. 26–28, 1992 (14 pages).
Product Brochure for Disperscoll KA–8464, Mobay Corporation, Jul., 1990.

Primary Examiner—Rabon Sergent

[57] ABSTRACT

Aqueous dispersion adhesives of anionic polyurethanes which have high heat resistance and low activation temperature, even when employed without addition of a crosslinker. The polyurethane is the reaction product of an isocyanate terminated polyurethane prepolymer, and water. The polyurethane prepolymer is the reaction product of a polyol component and a diisocyanate component, the polyol component including:

a sulfonated polyester polyol, a hydroxy carboxylic acid of the formula:

$$(HO)_x R(COOH)_y$$

wherein (R) represents a straight or branched, hydrocarbon radical containing 1 to 12 carbon atoms, and x and y represent values from 1 to 3, and optionally, a low molecular weight aliphatic diol having a molecular weight of from 60 to 400 a non-sulfonated polyol, and the diisocyanate component being selected from the group consisting of aromatic diisocyanates, isopherone diisocyanate, hexamethylene diisocyanate and mixtures thereof. The dispersions are prepared by mixing prepolymer and water at a temperature of at least 60° C. for sufficient time to fully react the isocyanate groups in a prepolymer self-extension reaction with water, typically at least 0.5 hour. The dispersions of the invention provide higher strength adhesive bonds than identical prepolymer dispersions extended with diamine chain extender, instead of water, after dispersion.

31 Claims, No Drawings

U.S. PATENT DOCUMENTS

| | | | |
|---|---|---|---|
| 4,066,591 | 1/1978 | Scriven et al. | 428/425 |
| 4,092,286 | 5/1978 | Noll et al. | 156/331 |
| 4,098,743 | 7/1978 | Scriven et al. | 528/80 |
| 4,108,814 | 8/1978 | Reiff et al. | 528/71 |
| 4,110,284 | 8/1978 | Violland et al. | 528/76 |
| 4,147,679 | 4/1979 | Scriven et al. | 428/426 |
| 4,190,566 | 2/1980 | Noll et al. | 528/76 |
| 4,203,883 | 5/1980 | Hangauer, Jr. | 528/44 |
| 4,237,264 | 12/1980 | Noll et al. | 528/67 |
| 4,254,201 | 3/1981 | Sawai et al. | 430/111 |
| 4,277,380 | 7/1981 | Williams et al. | 528/71 |
| 4,303,774 | 12/1981 | Nachtkamp et al. | 528/71 |
| 4,307,219 | 12/1981 | Larson | 528/71 |
| 4,385,137 | 5/1983 | Lorenz et al. | 523/310 |
| 4,460,738 | 7/1984 | Frentzel et al. | 524/591 |
| 4,501,852 | 2/1985 | Markusch et al. | 524/591 |
| 4,540,633 | 9/1985 | Kucera et al. | 524/501 |
| 4,574,147 | 3/1986 | Meckel | 528/64 |
| 4,576,987 | 3/1986 | Crockatt et al. | 524/487 |
| 4,590,255 | 5/1986 | O'Connor et al. | 528/71 |
| 4,623,592 | 11/1986 | Daudé et al. | 428/423.3 |
| 4,636,546 | 1/1987 | Chao | 524/507 |
| 4,663,337 | 5/1987 | Das et al. | 514/382 |
| 4,711,935 | 12/1987 | Gmoser et al. | 525/452 |
| 4,762,880 | 8/1988 | Leung | 524/853 |
| 4,764,553 | 8/1988 | Mosbach et al. | 524/591 |
| 4,791,168 | 12/1988 | Salatin et al. | 524/601 |
| 4,801,644 | 1/1989 | Coogan | 524/839 |
| 4,851,459 | 7/1989 | Ramalingam | 523/414 |
| 4,870,129 | 9/1989 | Henning et al. | 524/840 |
| 4,876,308 | 10/1989 | Melby et al. | 524/780 |
| 4,883,694 | 11/1989 | Ramalingam | 428/35.2 |
| 4,895,894 | 1/1990 | Ruetman et al. | 524/840 |
| 4,921,842 | 5/1990 | Henning et al. | 524/839 |
| 4,923,756 | 5/1990 | Chung et al. | 428/423.7 |
| 4,927,961 | 5/1990 | Fock et al. | 524/591 |
| 4,954,389 | 9/1990 | Acharya et al. | 428/212 |
| 4,963,637 | 10/1990 | Barksby | 528/59 |
| 5,001,189 | 3/1991 | Fock et al. | 524/840 |
| 5,021,286 | 6/1991 | Minegishi et al. | 428/198 |
| 5,023,309 | 6/1991 | Kruse et al. | 528/49 |
| 5,039,732 | 8/1991 | Arora | 524/591 |
| 5,124,424 | 6/1992 | Endo et al. | 528/48 |
| 5,250,610 | 10/1993 | Hansel et al. | 524/591 |
| 5,331,039 | 7/1994 | Blum et al. | 524/840 |
| 5,334,690 | 8/1994 | Schafheutle et al. | 528/71 |
| 5,344,873 | 9/1994 | Blum | 524/840 |
| 5,432,228 | 7/1995 | Hilken et al. | 524/840 |

AQUEOUS NON-GELLING, ANIONIC POLYURETHANE DISPERSIONS AND PROCESS FOR THEIR MANUFACTURE

CROSS-REFERENCE TO RELATED APPLICATION

This application is a continuation-in-part of copending application Ser. No. 08/304,653, filed Sep. 9, 1994, incorporated herein by reference, and a continuation-in-part of copending application Ser. No. 08/343,676, filed Nov. 22, 1994, which is a continuation-in-part of application Ser. No. 08/126,508, filed Sep. 24, 1993, now abandoned.

BACKGROUND OF THE INVENTION

1. Field of the Invention

This invention relates new to aqueous polyurethane dispersion adhesive compositions which can be an one component or a two component for use in thermoforming. More particularly, this invention relates to aqueous polyurethane dispersion adhesive compositions comprising mixed sulfonate and carboxylate anionic polyurethane dispersions, and with or without compatible crosslinking agents. These new adhesive compositions exhibit good stability at low pH values, long pot life, high green strength, good water resistance and improved heat resistance.

2. Description of the Prior Art

Aqueous dispersions of polyurethanes are known and are described in, for example, U.S. Pat. No. 3,479,310; *Angew. Chem.*, 82, 53, (1972); and *Angew. Makromol. Chem.*, 98, (1981).

U.S. Pat. No. 3,479,310 to Dieterich et al discloses dispersing in water a fully chain extended, NCO-free polyurethane having internal ionic salt groups.

For anionic aqueous polyurethane dispersions, the ionic salt groups are salts of carboxylic acid or sulfonic acid.

Aqueous polyurethanes having only internal carboxylate groups as anionic moieties are stable only at pH>7. Such polyurethane dispersions can form a two component adhesive composition with compatible crosslinkers, such as polyfunctional isocyanates, epoxies or aziridines.

Henning, et al., U.S. Pat. No. 4,870,129, discloses use of the sodium salt of N-(2-aminoethyl)-2-aminoethane sulfonic acid (AAS salt) to prepare polyurethane dispersions. The aqueous polyurethane dispersions are reported to have exhibited good stability at low pH values (5–7), high green strength and medium heat resistance.

Usually, after blending the sulfonated polyurethane dispersions with a polyisocyanate crosslinker, such as the dispersible polyisocyanate in U.S. Pat. No. 4,663,377 to Hombach et al, their heat resistance will be improved.

Leung, U.S. Pat. No. 4,762,880, discloses water-based thermoforming adhesives comprising aromatic polyurethanes, cross-linking agents and others. These kind of adhesive compositions will need high temperature to activate due to the aromatic polyurethane component.

U.S. Pat. No. 4,870,129 to Henning et al discloses an adhesive consisting of an aqueous polyurethane containing chemically incorporated carboxylate or sulfonate groups. The adhesive of this reference showed low activation temperature but only medium heat resistance.

Duan et al in copending application Ser. No. 08/304,653 filed Sep. 9, 1994, and copending application 08/343,676, filed Nov. 22, 1994 as a continuation in part of 08/126,508, filed Sep. 24, 1993, now abandoned, disclose aqueous polyurethane dispersions based on sulfonated polyester polyols, which have an unusually high crystallization rate, while also exhibiting good stability at low pH values, high green strength, and medium and high heat resistance.

In the preparation of anionic polyurethane dispersions it is generally preferred to prepare a polyurethane prepolymer having a small residual free isocyanate content, disperse the prepolymer in water, and then add a plural functional relatively low molecular weight primary and/or secondary amine as a chain extender. This chain extension process is needed because a higher molecular weight polyurethane-urea having high heat resistance is obtained after extension. Chain extension, however presents some problems. The reaction of an amine with the free isocyanate of the prepolymer is a very rapid and vigorous reaction, therefore increasing the possibility of side reactions (creating a branching or network structure) and gelling.

It is known that chain extension can also be accomplished by permitting reaction of an isocyanate functional group on the polyurethane prepolymer with water via a mechanism which is believed to generate amine functional group on the prepolymer which promptly reacts with another isocyanate functional group of the prepolymer to give a self-extended polymer. However, carbon dioxide is given off in this reaction and the pH of the dispersion consequently drops during the extension reaction. For carboxylate anion dispersions, the pH drop can cause the polymer to come out of dispersion. For sulfonate dispersions, such as disclosed in the examples of GB 1,128,568, high amounts of solvent are used to accomplish dispersion (approximately ⅓ of the total dispersion weight), most of which is subsequently distilled off. A stable dispersion reportedly results. However the equipment needed to distill off and recover excess solvent is very expensive and not practical for producing polyurethane dispersion products with optimal properties for specific industrial applications.

SUMMARY OF THE INVENTION

The present invention is directed to novel aqueous sulfonated polyurethane dispersions having low activation temperatures, and high heat resistance, even without addition of a crosslinker at the time of use, and to the process for preparing such dispersions. The aqueous polyurethane dispersion adhesive compositions of the invention have good compatibility with other water based polymers, such as other aqueous polyurethane dispersions either sulfonated or carboxylated polyurethane dispersions, vinyl acetate emulsions and acrylate emulsions, and also have good compatibility with thickening agents and pigments.

The compositions of the invention are aqueous dispersions of an anionic polyurethane, the polyurethane comprising the reaction product of an isocyanate terminated polyurethane prepolymer, and water. The polyurethane prepolymer is the reaction product of a polyol component and a diisocyanate component, the polyol component comprising:

a sulfonated polyester polyol, and a hydroxy carboxylic acid of the formula:

wherein (R) represents a straight or branched, hydrocarbon radical containing 1 to 12 carbon atoms, and x and y represent values from 1 to 3, and the diisocyanate component selected from the group consisting of aromatic diisocyanates, isophorone diisocyanate, hexamethylene diisocyanate and mixtures thereof. In a preferred embodiment of the invention the polyol component also includes a low molecular weight aliphatic diol having a molecular weight of from 60 to 400. Optionally, the polyurethane prepolymer can also comprise a non-sulfonated polyol.

The dispersions of the invention may be utilized with or without a compatible crosslinker. In their preferred embodiments, even the uncrosslinked adhesives provide equivalent or better heat resistance than prior art dispersions to which a crosslinker has been added at the time of use, and better heat resistance than similar uncrosslinked polymer dispersions prepared using a diamine chain extender.

The invention also pertains to a method for preparing such dispersions in which the addition of isocyanate functional anionic polyurethane prepolymer to water is accomplished at a temperature of at least 60° C., and the reaction temperature is subsequently maintained at or above 60° C. for sufficient time to complete the chain extension reaction with water.

DETAILED DESCRIPTION OF THE INVENTION

The isocyanate terminated polyurethane prepolymer used in the dispersions of the invention are reaction products of a polyol mixture and a polyisocyanate. The polyol mixture comprises a sulfonated polyester polyol, a hydroxy carboxylic acid and a low molecular weight diol, and optionally a non-sulfonated polyol.

The sulfonated polyester polyols used to form the isocyanate terminated polyurethane prepolymer may be any polyester polyol which incorporates sulfonate groups via sulfonate functional dicarboxylic acid residues and/or sulfonate functional diol residues. The sulfonate functional groups may be in acid or salt form. Suitable salt forms are alkali metal salts, or tertiary amine salts. Typically such sulfonate functional dicarboxylic acid residues and/or sulfonate functional diol residues are a minor portion of the diol and/diacid moieties of the polyester, preferably 1.0%–10.0% by weight of the polyester. The non-sulfonated diacids and diols used in forming the sulfonated polyesters may be aromatic or aliphatic. Examples of the non-sulfonated diacids include adipic, azelaic, succinic, suberic and phthalic acids. Examples of the non-sulfonated diols include ethylene glycol, condensates of ethylene glycols, butanediol, butenediol, propanediol, neopentylglycol, hexanediol, 1,4-cyclohexane dimethanol, 1,2-propylene glycol and 2-methyl-1,3 propanediol. Examples of the sulfonate diacids include sulfoisophthalic acid, 1,3-dihydroxybutane sulfonic acid and sulfosuccinic acid. Examples of the sulfonate diols include 1,4 dihydroxybutane sulfonic acid and succinaldehyde disodium bisulfite.

The preferred sulfonated polyester polyols are based on 5-sulfoisophthalic acid monosodium salt, 1,6-hexanediol and adipic acid. Examples of preferred commercially available sulfonated polyester polyols are Rucoflex XS-5483-55 and Rucoflex XS-5536-60, made by Ruco Polymer Corporation. These sulfonated polyester polyols are based on 5-sulfoisophthalic acid monosodium salt (4 wt. % in XS-5483-55, and 6 wt. % in XS-5536-60), 1,6-hexanediol and adipic acid.

The sulfonated polyester polyols desirably will have a molecular weight in the range of about 500 to 10,000 and a melting temperature in the range of about 10° to 100° C. The preferred molecular weight range is about 1,000 to 4,000 and the preferred melting temperature is between 30° C. and 80° C., more preferably between 40° C. and 60° C.

Molecular weights referred to herein are number average molecular weights.

The hydroxy carboxylic acids used to form the isocyanate terminated polyurethane prepolymer are compounds of the formula:

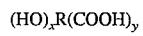

wherein R represents a straight or branched, hydrocarbon radical containing 1 to 12 carbon atoms, and x and y represent values from 1 to 3. Preferably, the hydroxy carboxylic acids are α,α-dimethylol alkanoic acids represented by the formula:

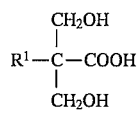

where $R^1$ denotes hydrogen or an alkyl group with up to 9 carbon atoms. Examples of such compounds are 2,2-dimethylolacetic acid, 2,2-dimethylolpropionic acid, 2,2-dimethylolbutyric acid and 2,2-dimethylolpentanic acid. The preferred dihydroxyalkanoic acid is 2,2-dimethylolpropionic acid (DMPA).

The low molecular weight diols used in forming the isocyanate terminated polyurethane prepolymer are aliphatic diols, particularly alkylene diols. Their molecular weight range is from 60 to 400. Preferably, the low molecular weight diols are $C_2$–$C_8$ alkylene diols and most preferably $C_3$–$C_6$ alkylene diols examples of the diols are ethylene glycol, 1,3-propylene glycol, 1,4-butanediol (1,4-BD) and 1,6-hexanediol.

The polyol component utilized to make the polyurethane dispersions of the invention may include, in addition to the sulfonated polyester polyol optionally also a non-sulfonated polymeric polyol, for instance a polyester polyol or a polyether polyol or a mixture of polyester and polyether polyols.

The diisocyanates which are used in forming the isocyanate terminated polyurethane prepolymer are aromatic diisocyanates, isophorone diisocyanate (IPDI), hexamethylenediisocyanate (HDI), and mixtures thereof. Examples of suitable aromatic diisocyanates are phenylenediisocyanate, tolylenediisocyanate (TDI), biphenylenediisocyanate, naphthylenediisocyanate and diphenylmethanediisocyanate (MDI).

In the polyol component the polyols are suitably employed in the following relative weight ratios of sulfonated polyester polyol/hydroxy carboxylic acid/low molecular weight diol/non-sulfonated polyol: 10–50/0.5–5/ 0.1–2/0–20, preferably: 20–40/1–3/0.5–1.5/0–10. In forming the polyurethane prepolymer the ratio of NCO groups in the diisocyanate component to OH groups in the polyol component is suitably 1.1–1.9:1, preferably 1.2–1.6:1. The prepolymer suitably is reacted to provide a NCO level of 1–5% by weight.

The polyurethane prepolymer may be formed neat or in the presence of a solvent suitably by reaction at a temperature from room temperature to 100° C., typically at a temperature of 50°–80° C. A catalyst, such as a tertiary amine or tin salt catalyst may be employed if desired. The prepolymer is desirably formed in the presence of a water compatible solvent such as 1-methyl-2-pyrrolidone (NMP), dipropylene glycol methyl ether acetate (DPMA), methyl ethyl ketone (MEK), or acetone. The solvent, however is employed at levels much less than reported in the prior art for anionic, water-extended polyurethane prepolymers. Suitably the solvent level will correspond to a level of 0–10% by weight of the dispersion, more preferably 0.5–7.5%, still more preferably 1–3%. If a still lower solvent level is desired after dispersion, the solvent may easily be reduced by simple distillation, generally with reduced pressure. However if the solvent content is high, as with prior art processes, the necessary solvent distillation requires very complicated and expensive equipment, and still does not eliminate all solvent.

After the prepolymer is formed, it is dispersed in water. To accomplish dispersion, the sulfonate groups, if not already in salt form, and at least a portion of the carboxylic acid groups of the prepolymer are neutralized with a tertiary amine. The tertiary amine may be added with the water, but more preferably neutralization is accomplished before the water is added, suitably by direct addition to the prepolymer/solvent mixture.

After addition of the tertiary amine, the acid number of the dispersion should be no more than 15, preferably less than 5 and more preferably the tertiary amine is in excess of the acid groups so that there is no free acid at the time of dispersion.

In the process of the invention, the selection of diisocyanate, the use of the dihydroxycarboxylic acid and the temperature of components when the dispersion is made and the free isocyanate of the prepolymer is partially hydrolyzed in water to accomplish self-addition and thereby increase molecular weight are very important. In the case of omission of the carboxylic acid, the resulting prepolymer, when added to water with the low solvent levels employed in the invention, yield unprocessable gels of the prepolymer/solvent/water mixture.

In the case of too low a temperature during dispersion and chain extension, a portion of the polymer may precipitate during the chain extension reaction. A temperature of at least 60° C., preferably at least 70° C., is recommended for a reaction time of 0.5–10 hours, preferably 1–3 hours, most preferably about 2 hours. During the chain extension reaction carbon dioxide is produced and the pH of the dispersion drops. For dispersions containing only carboxylate anionic groups this pH drop leads to precipitation of polymer. However in the formulations of the invention the dispersions are stable so long as the temperature is maintained at or above 60° C. for a sufficient time. The minimum time is believed to be the time required to drive the water isocyanate reaction and self chain extension reaction to completion. While the chain extension reaction time is shortened as temperature is increased it is not recommended that the temperature increase above about 90° C. as too rapid a reaction can lead to undesirable formation of foam due to carbon dioxide gas evolution. Once the chain extension reaction is complete, the dispersion is stable and may be cooled to ambient temperature without causing precipitation, gelation or foaming.

The compositions of the invention may be crosslinked by adding a crosslinker to the dispersion at, or shortly before, the time it is applied to a substrate and dried. Conventional polyisocyanate crosslinkers may not be suitable for this purpose since the polymer has little or no terminal amine groups. However, crosslinking can be accomplished through the carboxylate groups introduced into the sulfonated polyurethane polymer via the hydroxy carboxylic acid component of the polyol component. The carboxylate groups are reacted with carboxylic acid reactive crosslinkers which are active at room temperature, such as polyfunctional aziridine compounds, zinc ammonium carbonate, zirconium carbonate or polyfunctional carbodiimide compounds. Typically crosslinkers are added at a level of 1–10% by weight.

In copending application 08/304,653 it was reported that the heat resistance of the aqueous diamine-extended polyurethane dispersions of that application was significantly improved by the employment of the low molecular weight diol in forming the polyurethane prepolymer. In fact the heat resistance of the polyurethane polymer was so greatly improved by the low molecular weight diol that one component adhesive compositions used without crosslinker, in preferred embodiments of the invention, gave better high temperature resistance than commercial prior art dispersion adhesives employing crosslinkers. Surprisingly, even better heat resistance is obtained with one-part compositions of the invention than are obtained for similar formulations extended with a diamine compound as disclosed in application 08/304,653.

The high heat resistance benefits are obtained with low activation temperature. In film bonding use, the dispersion adhesive, with or without crosslinker, is applied to a film web substrate and dried, after which it is heated and the second film web substrate applied. The temperature of heating, referred to in the art as the activation temperature, is selected to provide good tack so the adhesive bonds to the second web and to change the physical properties of the adhesive by increasing the physical or chemical crosslinks so that the adhesive after heating provides a higher heat resistance, and usually higher water and solvent resistance, than before heating. Higher temperatures are frequently required to accomplish a desired change in adhesive heat resistance properties than to merely assure good adhesive wetting. Unexpectedly, it has been found that the preferred one component aqueous polyurethane dispersion adhesives not only give high heat resistance, but also do so at low heat activation temperatures. Activation temperatures as low as 125° F. have been shown to effectively implement the heat resistance properties of the inventive formulations, even without crosslinker.

In accordance with the invention, the aqueous polyurethane dispersions of the invention also have small particle sizes and excellent stability over a large pH range (3–11).

The high green strength and high heat resistance at low activation temperature makes the one-component or two-component compositions of the invention particularly useful in automotive, aerospace, shoe material bonding, woodworking, bookbinding, fiberglass sizing and film laminating applications. For instance, a one-component composition substantially as in Example 1,2,3, and 10 below, may be used in automobiles, bonding polypropylene foam to polyvinyl chloride at activation temperature of about 102° C.; in aerospace, bonding of DuPont Tedlar® PVF to phenolic composite at activation temperatures in the range of from room temperature to 99° C.; in shoemaking, bonding leather to SBR (activation temperature 66°–77° C.), and bonding highly plasticized PVC to itself or other substrates (activation temperature 66°–77° C.); in woodworking, bonding PVC to medium density fiberboard (activation temperature 66° C.); in bookbinding, bonding paper to paper using activation temperatures from room temperature to 93° C.; in house siding for bonding Tedlar® to PVC, wood, wood composite, recycled wood and/or paper products; and in laminating of films of polyethylene terephthalate to films of polypropylene, polyethylene or aluminum or other metal foils (activation temperatures of 52°–66° C.).

The formulations of the invention have good compatibility with other water based polymer dispersions even those having low pH (pH 4–7). This compatibility makes the formulations of the invention useful in blends with acrylic, epoxy and vinyl acetate or other vinyl polymer dispersions, as well as other polyurethane polymer dispersions. Blends with water based acrylic polymers can be used for shoe and fiberglass sizing applications. Blends with vinyl acetate or other vinyl polymer dispersions have use in automotive, woodworking, and bookbinding applications.

The invention is further illustrated, by the following non-limiting examples in which all parts and percentages are by weight unless otherwise specified.

EXAMPLES

Heat resistance

Heat resistance reported for the polyurethane dispersion adhesives described in Examples 1–5 and 10–12 were obtained by drawing down the dispersion with or without a crosslinker on a 10 mil clear PVC film (polyvinyl chloride film from Laird Plastics) with a #28 Mylar rod to prime a 2.5×2.5 cm (1×1 inch) area of 2.5 cm wide strips of the PVC films. After the adhesive is dry to touch the primed PVC film is cut into 2.5×5 cm (1×2 inch) strips. The primed strip is heat sealed to another uncoated 2.5×5 cm PVC strip using a Sentinal Heat Sealer at 345 kPa (50 psi) nip pressure with a 30 second dwell time. The sealing temperatures (activation temperature) selected were as listed in the specific examples. The bonds were allowed to age 7 days and then the heat resistance temperature was measured.

A 100 g weight was attached to each PVC bond in a T-peel configuration and then placed in the Tenney oven. The T-peels had a 1 square inch bond area. The T-peels were subjected to a 25° C. increase in temperature each hour until 127° C. (260° F.). The temperatures were recorded by the Tenney sensing unit upon bond failure.

Green Strength

Green strengths as reported in Examples 10–12 were obtained from PVC to PVC laminates prepared as described. Peel strength was measured using an Intelet 500 instrument at 30.5 cm (12 inches) per minute. Green strength measurements were taken 15 minutes after heat sealing of the laminates.

Bonding Strength

Bonding strengths as reported in Examples 10–12 were obtained as for the green strength except the bonds were aged for 7 days before taking the peel strength measurement.

Abbreviations

The following abbreviations are used in the Examples:

| | |
|---|---|
| Rucoflex XS-5483-55 | a sulfonated polyester polyol based on 5-sulfoisophthalic acid monosodium salt, adipic acid and 1,6-hexanediol, OH number 49.0 |
| DMPA | dimethylolpropionic acid |
| 1,4-BD | 1,4-butanediol |
| IPDI | isophorone diisocyanate |
| HDI | hexamethylenediisocyanate |
| EDA | ethylenediamine |
| TEA | triethylamine |

Examples 1–5

In Examples 1–5, the activation temperature was 66° C. (150° F.).

Formulations

| Examples | 1 | 2 | 3 | 4 (Comparative) | 5 (Comparative) |
|---|---|---|---|---|---|
| Rucoflex XS-5483-55 | 213.8 | 213.8 | 213.8 | 213.8 | 213.8 |
| DMPA | 10.05 | 10.05 | 10.05 | 10.05 | 10.05 |
| 1,4-BD | 11.25 | 11.25 | 11.25 | 11.25 | 11.25 |
| IPDI | 31.08 | 31.08 | 31.08 | 31.08 | 31.08 |
| HDI | 47.04 | 47.04 | 47.04 | 47.04 | 47.04 |
| TEA | 6.0 | 6.0 | 12.0 | 6.0 | 6.0 |
| EDA | 0 | 0 | 0 | 6.48 | 2.16 |
| Acetone | 70.0 | 28.7 | 18.1 | 70.0 | 70.0 |
| Water | 604.3 | 554.3 | 585.4 | 604.3 | 604.3 |

Process for Examples 1–3

The Rucoflex-XS-5483-55, DMPA and 1,4-BD were melted and mixed at 60°–70° C. The IPDI, HDI and acetone were added, whereupon the temperature was maintained at about 70° C. for 3 hours. At this temperature, the TEA was added and stirred for 10–15 minutes. The prepolymer was dispersed by adding the water. The prepolymer dispersion was stirred for another 2 hours at 65° C. A finely divided dispersion was obtained.

Process for Examples 4–5 (Comparative Examples)

The Rucoflex XS-5483-55, DMPA and 1,4-BD were melted and mixed at 60°–70° C. The IPDI, HDI and acetone were added, whereupon the temperature was maintained at about 70° C. for 3 hours. At this temperature, the TEA was added and stirred for 10–15 minutes. The prepolymer was dispersed by adding 554.3 of water. Sixty minutes later, the EDA with 50.0 g of water was added. A finely divided dispersion was obtained.

Properties for Examples 1–5

| Examples | 1 | 2 | 3 | 4 | 5 |
|---|---|---|---|---|---|
| Solids % | 32.1 | 35.4 | 35.0 | 33.0 | 34.0 |
| pH | 7.1 | 7.2 | 7.3 | 10.0 | 7.8 |
| Viscosity (cps) | 125 | 45 | 15 | 450 | 350 |
| Particle Size (mm) | 150 | 145 | 180 | 170 | 160 |
| Heat resistance (t-peel, pvc/pvc) | No failure until 260° F. (127° C.) | No failure until 260° F. (127° C.) | No failure until 260° F. (127° C.) | 210° F. (99° C.) | 235° F. (113° C.) |

Example 1 and comparative Examples 4 and 5 have the same composition except that in Example 1 there is no EDA (diamine chain extender), and in Examples 4 and 5 the amount of EDA varies. The table shows that the heat resistance was increased when the amount of the EDA was decreased. The aqueous polyurethane prepolymer dispersion without chain extender exhibited the highest heat resistance. This is a result not predicted from the prior art.

Example 6 (Comparative Example)

Starting Materials

| Rucoflex XS-5483-55 | 213.8 |
|---|---|
| 1,4-BD | 6.75 |
| IPDI | 18.13 |
| HDI | 27.44 |
| Acetone | 15.2 |
| Water | 479.0 |

Process

The Rucoflex XS-5483-55 and 1,4-BD were mixed at 45°–50° C. At this temperature, the IPDI and the HDI were added. The temperature was increased to 70° C. and maintained for 2 hours, and then was increased to 80° C. in 0.5 hour. At this temperature, the prepolymer was dispersed by adding the water which was preheated to 80° C., and immediately the mixture gelled. This formulation contained no hard segment anionic groups.

Examples 7–9

Starting Materials

| Examples | 7 (Comparative) | 8 (Comparative) | 9 |
|---|---|---|---|
| Rucoflex XS-5483-55 | 213.8 | 213.8 | 213.8 |
| DMPA | 10.05 | 10.05 | 10.05 |
| 1,4-BD | 11.25 | 11.25 | 11.25 |
| IPDI | 31.08 | 31.08 | 31.08 |
| HDI | 47.04 | 47.04 | 47.04 |
| TEA | 6.0 | 6.0 | 6.0 |
| Acetone | 18.1 | 18.01 | 18.1 |
| Water | 604.3 | 604.3 | 604.3 |
| Dispersion temperature (°C.)* | 50 | 65 | 80 |
| Precipitation amount | 10% | 5% | None |

*Dispersion temperature: the prepolymer and the water were brought to the specified temperature before mixing and maintained at that temperature for a period of 2 hours.

Examples 7–9 illustrate the importance of maintaining an adequate elevated temperature while the isocyanate functional prepolymer is reacting with the water.

Example 10

Starting Materials

| Rucoflex XS-5483-55 | 213.8 |
|---|---|
| DMPA | 10.05 |
| 1,4-BD | 6.75 |
| IPDI | 25.9 |
| HDI | 39.2 |
| TEA | 8.0 |
| Acetone | 17.4 |
| Water | 546.7 |

Process

The Rucoflex XS-5483, DMPA and 1,4-BD were melted and mixed at 60°–70° C. The IPDI, HDI and acetone were added, whereupon the temperature was maintained at about 70° for 2 hours and then was increased to 80° C. in 0.5 hour. At this temperature, the TEA was added and stirred for 10 minutes. The prepolymer was dispersed by adding the water which was preheated to 80° C. The prepolymer dispersion was stirred for another 2 hours at 60° C.

A finely divided dispersion having a solids content of 35.0%, viscosity of 200 cps, particle size of 150 nm and a pH of 7.2 was obtained.

Properties

| Activation Temperature (°C.) | 52 | 66 | 79 | 93 |
|---|---|---|---|---|
| Green strength (T-Peel, kg/cm, PVC/PVC) | 2.4 | 2.8 | 3.9 | 5.5 |
| Bonding strength (T-Peel, kg/cm, PVC/PVC) | SF | SF | SF | SF |
| Heat resistance temp. (°C.) (T-Peel, 100 g load, PVC/PVC) | >127 | >127 | >127 | >127 |

SF: Substrate failure

Examples 11 & 12

Starting Materials

| Examples | 11 | 12 (Comparative) |
|---|---|---|
| Rucoflex XS-5483-55 | 213.8 | 213.8 |
| DMPA | 10.05 | 10.05 |
| IPDI | 18.1 | 18.1 |
| HDI | 27.4 | 27.4 |
| TEA | 8.0 | 8.0 |
| EDA | 0.00 | 3.15 |
| Acetone | 15.9 | 15.9 |
| Water | 699.2 | 699.2 |

Process for Example 11

The Rucoflex-XS-5483-55 and DMPA were melted and mixed at 60°–70° C. The IPDI, HDI and acetone were added, whereupon the temperature was maintained at about 70° C. for 2 hours and then was increased to 80° C. for 0.5 hour. At this temperature, the TEA was added and stirred for 10 minutes. The prepolymer was dispersed by adding the water which was preheated to 80° C. The prepolymer dispersion was stirred for another 2 hours at 60° C.

A finely divided dispersion having a solids content of 29.8%, viscosity of 1500 mPa.s particle size of 180 nm and a pH of 7.1 was obtained.

Process for Examples 12 (Comparative Example)

The prepolymer was prepared and neutralized with TEA as in Example 11. The prepolymer was dispersed by adding the water (minus 50 g) which was preheated to 80° C. 30 Minutes later, the EDA in 50 g water was added.

A finely divided dispersion having a solids content of 29.8%, viscosity of 1200 mPa.s particle size of 190 nm and a pH of 8.5 was obtained.

Properties for Examples 11 and 12

| Activation Temperature (°C.) Green strength (T-Peel, kg/cm, PVC/PVC) | 52 | 66 | 79 | 93 |
|---|---|---|---|---|
| Example 11 | 1.7 | SF | SF | SF |
| Example 12 | 2.3 | SF | SF | SF |

| -continued | | | | |
|---|---|---|---|---|
| Bonding strength (T-Peel, kg/cm, PVC/PVC) | | | | |
| Example 11 | 4.8 | 8.8 | 11.6 | 11.6 |
| Example 12 | 5.2 | 9.4 | 11.6 | 12.3 |
| Heat resistance temp. (°C.) (T-Peel, 100 g load, PVC/PVC) | | | | |
| Example 11 | >127 | >127 | >127 | >127 |
| Example 12 | 100 | 100 | 101 | 100 |

Substrate failure

What is claimed is:

1. An aqueous dispersion of an anionic polyurethane, the polyurethane comprising the reaction product of an isocyanate terminated polyurethane prepolymer and water, the polyurethane prepolymer comprising the reaction product of a polyol component and a diisocyanate component, the polyol component comprising:

a sulfonated polyester polyol, a hydroxy carboxylic acid of the formula:

$$(HO)_xR(COOH)_y$$

wherein (R) represents a straight or branched, hydrocarbon radical containing 1 to 12 carbon atoms, and x and y represent values from 1 to 3, and as optional components a low molecular weight aliphatic diol having a molecular weight of from 60 to 400 and a non-sulfonated polymeric polyol, and the diisocyanate component selected from the group consisting of aromatic diisocyanates, isophorone diisocyanate, hexamethylene diisocyanate and mixtures thereof.

2. A dispersion as in claim 1 wherein the low molecular weight aliphatic diol is present and is a $C_2$–$C_8$ alkylene diol.

3. A dispersion as in claim 2 wherein the low molecular weight aliphatic diol is ethylene glycol, 1,3-propylene glycol, 1,4-butanediol or 1,6-hexanediol.

4. A dispersion as in claim 1 wherein the sulfonated polyester polyol is a hydroxy terminated polyester formed of residues from at least one carboxylic diacid, at least one diol and at least one sulfonate diacid or sulfonate diol.

5. A dispersion as in claim 4 wherein the carboxylic diacid residue of the sulfonated polyester polyol comprises the residue of a diacid selected from the group consisting of adipic, azelaic, succinic, suberic and phthalic acids.

6. A dispersion as in claim 4 wherein the diol residue of the sulfonated polyester polyol comprises the residue of a diol selected from the group consisting of ethylene glycol, butanediol, butenediol, propanediol, neopentyl glycol, hexanediol, 1,4-cyclohexane dimethanol, 1,2-propylene glycol and 2-methyl-1,3-propanediol.

7. A dispersion as in claim 4 wherein the sulfonate diacid or sulfonate diol residue comprises the residue of at least one member of the group consisting of sulfoisophthalic acid, sulfosuccinic acid, 1,4-dihydroxybutane sulfonic acid and succinaldehyde disodium bisulfite.

8. A dispersion as in claim 1 wherein the sulfonated polyester polyol is based on 5-sulfoisophthalic acid monosodium salt, 1,6-hexanediol and adipic acid.

9. A dispersion as in claim 1 wherein the sulfonated polyester polyol has a number average molecular weight in the range of about 500 to 10,000 and a melting temperature in the range of about 10° to 100° C.

10. A dispersion as in claim 9 wherein the number average molecular weight range is about 1,000 to 4,000 and the melting temperature is about 40° to 60° C.

11. A dispersion as in claim 1 wherein the hydroxy carboxylic acid is a α,α-dimethylol alkanoic acid represented by the formula:

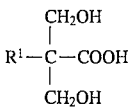

where $R^1$ denotes hydrogen or an alkyl group with up to 9 carbon atoms.

12. A dispersion as in claim 11 wherein the α,α-dimethylol alkanoic acid is selected from the group consisting of 2,2-dimethylolacetic acid, 2,2-dimethylolpropionic acid, 2,2-dimethylolbutyric acid, 2,2-dimethylolpentanic acid and mixtures thereof.

13. A dispersion as in claim 12 wherein the α,α-dimethylol alkanoic acid is 2,2-dimethylolpropionic acid.

14. A dispersion as in claim 1 wherein the polyol component includes said non-sulfonated polymeric polyol, said non-sulfonated polymeric polyol being selected from the group consisting of non-sulfonated polyester polyols, non-sulfonated polyether polyols and mixtures thereof.

15. A dispersion as in claim 1 wherein the polyols in said polyol component are employed in the following relative weight ratios of sulfonated polyester polyol/hydroxy carboxylic acid/low molecular weight diol/non-sulfonated polyol: 10–50/0.5–5/0.1–2/0–20.

16. A dispersion as in claim 15 wherein the polyols in said polyol component are employed in the following relative weight ratios of sulfonated polyester polyol/hydroxy carboxylic acid/low molecular weight diol/non-sulfonated polyol: 20–40/1–3/0.5–1.5/0–10.

17. A dispersion as in claim 1 wherein the polyurethane prepolymer is the product of a reaction in which said polyol component and diisocyanate component are reacted at a ratio of NCO groups to OH groups of 1.1–1.9:1.

18. A dispersion as in claim 17 wherein the polyurethane prepolymer is the product of a reaction in which said polyol component and diisocyanate component are reacted at a ratio of NCO groups to OH groups of 1.2–1.6:1.

19. An adhesive formulation prepared by blending a dispersion as in claim 1 with an acid reactive crosslinking agent.

20. An adhesive formulation as in claim 19 wherein the crosslinking agent is selected from the group consisting of polyfunctional aziridines, zinc ammonium carbonate and zirconium carbonate.

21. An adhesive formulation prepared by blending a dispersion as in claim 1 with a polyisocyanate crosslinking agent.

22. A bonded assembly of a pair of substrates, the assembly bonded with an adhesive comprising a dried dispersion of claim 1.

23. A bonded assembly as in claim 22 wherein, the substrate pairs include a member made of a material selected from the group consisting of polypropylene, polyvinyl chloride, phenolic composite, leather, styrene-butadiene rubber, fiberboard, paper, polyvinyl fluoride, wood, wood composite, recycled wood, polyethylene terephthalate, polyethylene, and metal.

24. A bonded assembly as in claim 22 wherein said adhesive consists essentially of said polyurethane.

25. A bonded assembly as in claim 22 wherein said adhesive further comprises at least one of an acrylic, an epoxy, a vinyl, or a second polyurethane polymer.

26. A bonded assembly as in claim 22 wherein said adhesive further comprises a polyisocyanate or an acid reactive crosslinker.

27. A bonded assembly as in claim 22 wherein said substrate pair is selected from the group consisting of polypropylene foam/polyvinyl chloride; polyvinyl fluoride/phenolic composite; leather/styrene-butadiene rubber; PVC/fiberboard; paper/paper; polyvinyl fluoride/polyvinyl chloride; polyvinyl fluoride/wood; polyvinyl fluoride/wood composite; polyvinyl fluoride/recycled wood; polyvinyl fluoride/paper products; polyethylene terephthalate/polypropylene; polyethylene terephthalate/polyethylene; polyethylene terephthalate/metal and plasticized polyvinyl chloride/plasticized polyvinyl chloride.

28. An adhesive formulation prepared by blending a dispersion as in claim 1 with at least one of an acrylic, an epoxy, a vinyl, or a second polyurethane polymer.

29. A method of forming an aqueous dispersion of an anionic polyurethane, the polyurethane comprising the reaction product of an isocyanate terminated polyurethane prepolymer and water, the method comprising:

preparing an isocyanate functional polyurethane prepolymer, the polyurethane prepolymer having a free isocyanate content of 1–5% by weight and comprising the reaction product of a polyol component and a diisocyanate component, the polyol component comprising:
a sulfonated polyester polyol, and
a hydroxy carboxylic acid of the formula:

$$(HO)_xR(COOH)_y$$

wherein (R) represents a straight or branched, hydrocarbon radical containing 1 to 12 carbon atoms, and x and y represent values from 1 to 3, and the diisocyanate component selected from the group consisting of aromatic diisocyanates, isophorone diisocyanate, hexamethylene diisocyanate and mixtures thereof;

dispersing the prepolymer in an aqueous dispersing medium free of primary or secondary amine at a temperature of at least 60° C. for a time sufficient to allow all isocyanate groups to be reacted in a reaction in which the prepolymer is self-extended by reaction with water.

30. The method of claim 29 in which the polyol component further comprises a low molecular weight aliphatic diol having a molecular weight of from 60 to 400.

31. The method of claim 29 in which the polyol component further comprises a non-sulfonated polymeric polyol.

* * * * *